No. 617,690. Patented Jan. 10, 1899.
J. D. NEIPLING.
GLASS ANNEALING AND PURIFYING FURNACE.
(Application filed May 5, 1898.)
(No Model.) 3 Sheets—Sheet 1.
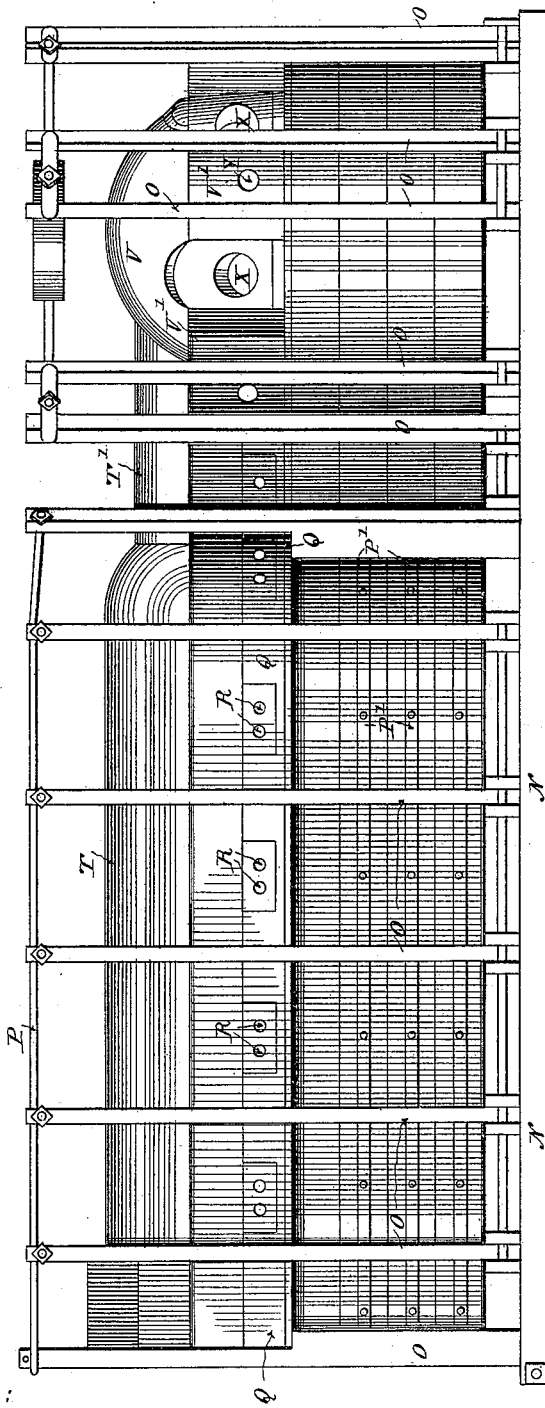
Fig. 1.
WITNESSES:
INVENTOR
Joseph D. Neipling
BY 
ATTORNEY.
THE NORRIS PETERS CO., PHOTO-LITHO., WASHINGTON, D. C.

No. 617,690. Patented Jan. 10, 1899.
J. D. NEIPLING.
GLASS ANNEALING AND PURIFYING FURNACE.
(Application filed May 5, 1898.)

(No Model.) 3 Sheets—Sheet 2.

WITNESSES:
INVENTOR
BY
ATTORNEY.

THE NORRIS PETERS CO., PHOTO-LITHO., WASHINGTON, D. C.

No. 617,690. Patented Jan. 10, 1899.
J. D. NEIPLING.
GLASS ANNEALING AND PURIFYING FURNACE.
(Application filed May 5, 1898.)
(No Model.) 3 Sheets—Sheet 3.

Witnesses:

Inventor
Joseph D. Neipling

UNITED STATES PATENT OFFICE.

JOSEPH D. NEIPLING, OF KANE, PENNSYLVANIA.

GLASS ANNEALING AND PURIFYING FURNACE.

SPECIFICATION forming part of Letters Patent No. 617,690, dated January 10, 1899.

Application filed May 5, 1898. Serial No. 679,839. (No model.)

*To all whom it may concern:*

Be it known that I, JOSEPH D. NEIPLING, a citizen of the United States of America, and a resident of Kane, in the county of McKean and State of Pennsylvania, have invented certain new and useful Improvements in Glass Annealing and Purifying Furnaces, of which the following is a specification.

My invention relates to improvements in glass-furnaces, and has special reference to a furnace for melting the glass-making material and separating the pure from the impure glass.

The main object of my invention is the provision of a furnace of this character in which is a compartment by which the glass is easily and thoroughly purified and whose construction is extremely simple, efficient, and thoroughly useful and practical.

Another object of my invention is the provision of a glass-furnace which melts the glass-making material, clears the glass after it is melted, separates the pure from the impure glass, and finally gathers it, so that it is readily accessible to the workers.

To attain the desired objects, the invention consists of a furnace of this character embodying novel features of construction and combination of parts, substantially as disclosed herein.

Figure 2:
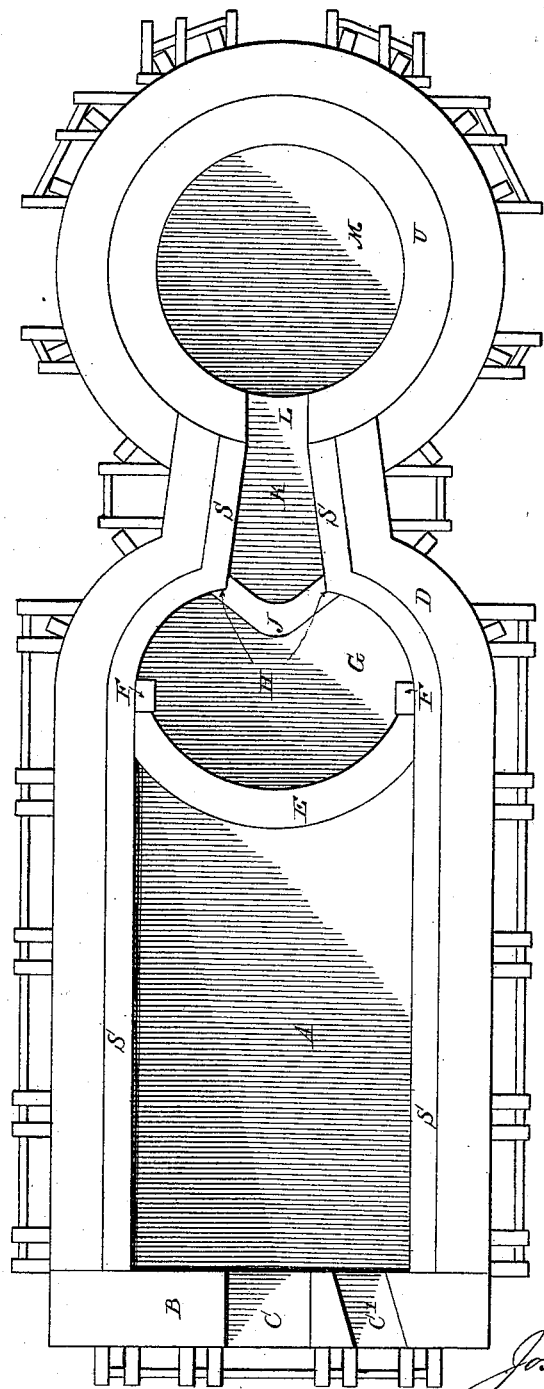
Figure 3:
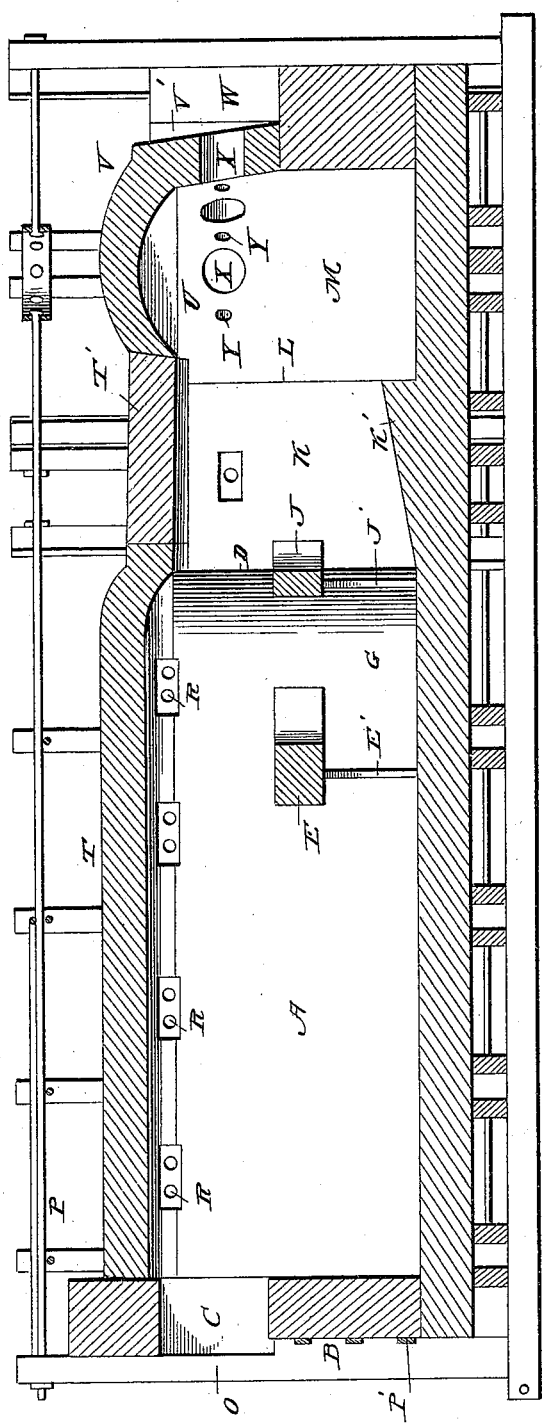

Figure 1 represents a side elevation of my improved glass annealing and purifying furnace. Fig. 2 represents a top plan view of my invention, showing the construction of the interior, the top of the furnace having been removed. Fig. 3 represents a longitudinal sectional view of my improved glass-furnace.

I shall describe my furnace, starting at the place where the glass-making material is first placed in the furnace and trace it through the whole operation of purifying it, in order that the construction and operation may be more readily understood.

In the drawings, A designates the melting-compartment, which has the square end B, near the top of which is located the large opening C and small inclined opening C', through which the glass-making material passes to enter the melting-compartment, and the semicircular end D, which tends to confine the glass in a smaller space after it has been melted. In this melting-compartment, near the rounded end thereof, is the arc-shaped floater E, having its ends abutting against the stays F and also mounted upon the legs E', which rest upon the floor of the compartment to limit the movement of the floater downward and allow the free passage of the glass below the floater. It is clearly seen that this floater divides the compartment into another smaller compartment G, which I term the "clearing-compartment," as it clears the glass which enters it. In the center of the rounded end D of the compartment, extending the full height thereof, is the opening or exit H, in whose mouth is secured the small arc-shaped floater J, whose curved portion extends toward the interior of the compartment and is supported in its center by the leg J'. Leading from this opening H is the channel or center compartment K, in which is the inclined floor K', and thus it will be seen that the rounded portion of the melting-chamber terminates in a small space which leads into the center compartment, which is provided with the inclined floor, which makes the space for the glass to flow through still smaller and only allows the center glass to pass through the opening or entrance L to the circular gathering-compartment M. This whole structure is mounted upon the base N, which has rising therefrom the rods O, at whose upper ends are connected the buckstays P, of ordinary construction. It will be noticed that secured upon the side walls of the melting-chamber are the metal side bars P', which are adapted to hold the side blocks of the furnace together, and it will also be seen that in the top shouldered rim Q of this chamber I provide the openings R for the entrance of the gas or hot air, as desired, to melt the glass-making material.

Adapted to rest upon the top beveled edges S of the melting, clearing, and center compartments are the large and small rounded tops or covers T and T', while adapted to rest upon the top end of the circular gathering-compartment, down over the rim U thereof, is the domed circular cover or top V, which is formed with the wings V', whose lower ends extend below the lower surface of the dome and fit in the space on the edge of the compartment outside of the rim and are placed in contact therewith by means of the rods and buckstays, as described. In the spaces between the wings V' are the large circular openings X, which pass through the walls of the dome and allow access to the glass in the gathering-compartment and through which the glass is brought to be worked, and passing through the wings are the gas or hot-air passages or openings Y.

From this description, taken in connection with the drawings, the construction and operation of my furnace will be readily understood; but, briefly stated, it is as follows: The glass-making material is placed through the openings into the melting-compartment, where the material is melted and runs forward. The large floater then skims the top or surface glass off, in which are most of the impurities, the purer glass passing under the floater into the clearing-compartment, whence it passes forward under the smaller floater, which skims the residue of the impure glass, into the center or channel compartment, which having the inclined floor allows only the center portion of the glass to pass into the gathering-compartment, from whence it is taken to be worked.

It is evident that I provide a furnace for melting and purifying glass which only allows the center glass to be worked and thus insures the production of the best glass, and it is also evident that I provide a glass-purifying furnace which is very simple, durable, and inexpensive, as well as thoroughly practical and useful.

I claim—

1. A glass-furnace, consisting of the housing comprising a long melting chamber or compartment having a floater near one end thereof, the central purifying-compartment having an inclined floor and floater at its mouth adjacent to the melting-chamber, said floor being adapted to keep the impure bottom glass from the bulk and the floater being adapted to keep the floating impurities from the bulk, and a circular gathering-compartment connected to the central compartment and into which the central pure glass is gathered to be worked.

2. A glass-furnace, consisting of the housing, comprising in its construction, a large melting-compartment having its sides tapering toward its exit end and having a floater vertically movable therein, the central purifying-compartment having an inclined floor and a floater located at its mouth adjacent to the melting-chamber, said floor being tapered toward its exit end, and a gathering-compartment into which the purifying-compartment empties for gathering and working the purified glass.

3. A glass-furnace, consisting of the three chambers, one for gathering the purified glass, another for the melting process of the glass having located therein an arc-shaped floater to hold the upper or floating impurities of the glass from being worked, and an intermediate chamber between the melting-chamber and gathering-chamber for purifying the glass, said purifying-chamber having its sides tapered toward the gathering-chamber and having located at its inner end a smaller arc-shaped floater to further hold the upper impurities of the glass and being further provided with an inclined floor to keep the bottom impure glass from passing into the gathering-compartment and to allow only the center or pure glass to be worked.

4. A glass-furnace, consisting of the large compartment, a floater located therein dividing the compartment into a melting-compartment and a small clearing-compartment, a purifying-compartment leading from the clearing-compartment having a small floater located at its mouth adjacent to the melting-chamber and provided with a floor inclining from the exit to the mouth, and a circular gathering-compartment into which the purifying-compartment leads.

5. A glass-furnace, consisting of a housing made into three separate communicating compartments, one for melting the glass material having a vertically-movable floater located therein to clear the glass and divide the compartment into a clearing and melting compartment, a small purifying-compartment having a floater at its mouth adjacent to the melting chamber or compartment and an inclined floor or bottom, said floater and floor being adapted to allow only the central pure glass to pass through said compartment, a gathering-compartment into which the purifying-compartment leads adapted to receive the pure glass and being provided with openings therein for the reception of instruments or utensils for working glass, and means whereby the material and glass in all three compartments are heated.

Signed by me, at Kane, McKean county, Pennsylvania, this 11th day of April, 1898.

JOSEPH D. NEIPLING.

Witnesses:
ALBERT A. ESTEY,
JACOB G. SCHUCK.